United States Patent [19]
Uchiyama et al.

[11] Patent Number: 5,140,681
[45] Date of Patent: Aug. 18, 1992

[54] MULTI-PROCESSING SYSTEM AND CACHE APPARATUS FOR USE IN THE SAME

[75] Inventors: Kunio Uchiyama; Hirokazu Aoki, both of Hachioji; Susumu Hatano, Musashino; Kanji Oishi, Koganei; Takashi Kikuchi, Akishima; Hiroshi Fukuta, Kodaira; Yasuhiko Saigou, Fuchu, all of Japan

[73] Assignees: Hitachi, Ltd.; Hitachi VLSI Engineering Corp., both of Tokyo, Japan

[21] Appl. No.: 355,680

[22] Filed: May 23, 1989

[30] Foreign Application Priority Data

May 25, 1988 [JP] Japan .................. 63-125782

[51] Int. Cl.⁵ .................. G11C 7/00; G06F 12/00; G06F 13/00
[52] U.S. Cl. .................. 395/425; 365/49; 365/189.01
[58] Field of Search ... 364/200 MS File, 900 MS File; 395/425; 365/189.01, 49

[56] References Cited

U.S. PATENT DOCUMENTS

| | | | |
|---|---|---|---|
| 4,264,953 | 4/1981 | Douglas et al. | 364/200 |
| 4,622,631 | 11/1986 | Frank et al. | 364/200 |
| 4,755,930 | 7/1988 | Wilson, Jr. et al. | 364/200 |
| 4,959,777 | 9/1990 | Holman, Jr. | 364/200 |
| 5,025,365 | 6/1991 | Mathur et al. | 364/200 |

FOREIGN PATENT DOCUMENTS

0082949 7/1983 European Pat. Off.
51-49535 12/1976 Japan.

OTHER PUBLICATIONS

"ACM Computing Surveys", vol. 14, No. 3, Sep. 1982, pp. 500–502.
IBM Technical Disclosure Bulletin, vol. 27, No. 12, May 1985, pp. 6845–6846, "Shared Instruction and/or Data Caches in a Multiprocessing System".

*Primary Examiner*—Alyssa H. Bowler
*Attorney, Agent, or Firm*—Antonelli, Terry, Stout & Kraus

[57] ABSTRACT

A main memory is subdivided into a shared region to undergo a write access from a plurality of processors and an input/output device and a plurality of private regions to undergo a write access only from the associated processor. Each of the cache devices includes a region discriminating circuit for determining whether an address generated from the processor is to be employed for an access to the shared region or to the private regions. If the access is to be conducted to the shared region, the cache devices operate according to the write-through method. On the other hand, if the access is to be conducted to the private region, the cache devices operate according to the copy-back method. When the processor or the input/output device rewrites data in the shared region of the main memory, the stored data of the shared region in the cache device of the processor is invalidated.

4 Claims, 8 Drawing Sheets

MULTI-PROCESSING SYSTEM AND CACHE APPARATUS FOR USE IN THE SAME

BACKGROUND OF THE INVENTION

The present invention relates to a multi-processing system and a cache apparatus employed in the system.

There has been known a processing system in which, in order to match the machine cycle time of a processor with an operating time of a main memory, a cache memory operating with a high-speed is disposed between the processor and the main memory so as to improve the system efficiency. Heretofore, as a store method for a cache, there have been employed a write-through method and a copy-back method as described in the "ACM, Computing Surveys", Vol. 14, No. 3, September 1982, pp. 500–502.

In the write-through method, in a case where a processor conducts a write operation, if a hit occurs in the cache, the write operation is accomplished both in the cache and in the main memory such that the contents of the cache are consistent with those of the main memory in all situations.

In contrast, according to the copy-back method, if a hit occurs in the cache, the write operation is accomplished only in the cache, namely, data is not written in the main memory.

Comparing the write-through method with the copy-back method, the control operation of the copy-back method is more complicated and hence requires a larger amount of hardware, which is emphasized particularly in a control operation employed in a multi-processing system of a shared memory type to retain consistency of the contents of each cache. An example of the copy-back method has been described, in Japanese Patent Publication No. 51-49535 which corresponds to U.S. patent application Ser. No. 179,376 filed on Sep. 10, 1971.

However, with respect to the performance, in the copy-back method, when a hit occurs in a cache, no write operation is carried out in the main memory; consequently, the write time of the main memory write operation can be dispensed with and hence the copy-back method is advantageous as compared with the write-through method in this regard. Furthermore, because the write time required to effect a write operation in the main memory is eliminated, there appears an advantage that the throughput required for the main memory is minimized. In a multi-processing system, the decrease of the memory throughput is particularly important to increase the system efficiency.

On the other hand, the U.S. Pat. No. 4,264,953 has disclosed a multi-processing system comprising a main memory, a plurality of processors communicating with the main memory, a plurality of cache memories corresponding to the plural processors, a plurality of address translators for translating virtual addresses (logical addresses) from the plural processors into physical addresses, and an input/output device.

In the system of the U.S. Pat. No. 4,264,953, in a case where data of a shared region of the main memory is stored in a cache, in order to avoid the problem of the data stored in the cache not corresponding to update data in the shared region of the main memory, an operation to copy the data of the shared region of the main memory into the cache is inhibited. On the other hand, in a case where data of the input/output device is stored in a cache, in order to avoid the problem of the data stored in the cache not being consistent with update data of the input/output device, the data of the input/output device is invalidated (purged) in the cache.

However, in the system described in U.S. Pat. No. 4,264,953, it may be assumed that the write-through method is adopted, and there has not been any indication related to a compatible employment of characteristics of both of the methods, namely, the write-through and copy-back methods.

SUMMARY OF THE INVENTION

As described above, in the copy-back method, although an advantageous feature is developed with respect to the efficiency of the system, there arises a problem that the control operation becomes complex and hence the amount of hardware required for the control operation is, increased. This is particularly emphasized in a control operation employed to sustain consistency among the stored data in the respective caches in a multi-processing system of a shared main memory type in which a cache is disposed for each processor.

It is therefore an object of the present invention to provide a multi-processing capable of operating in both the copy-back and write-through methods and a cache apparatus to be employed therein.

The main memory is subdivided into a shared region to be subjected to a write access from a plurality of processors and from an input/output device and a plurality of private regions to undergo a write access from the plural processors. Each of the plural cache devices has a region discriminating circuit for determining whether an address produced from a processor is used to access the shared region or any private region.

If the processor accesses the shared region, the cache device operates in the write-through method. On the other hand, if the access from the processor aims at a private region, the cache device operates in the copy-back method.

Moreover, the cache device is provided with an invalidating control circuit for invalidating data stored in the cache in a case where data of the shared region of the main memory is rewritten by use of data from another processor or from the input/output device.

Whether the address, issued from a processor accessing the main memory or a cache, accesses the shared region or any private region is determined by an output from the region discriminating circuit.

In the former case (of the shared region access), according to the output from the region discriminating circuit, the cache device operates in conformity with the write-through method. In con sequence, so long as the other processor or the input/ output device conducts no write operation at the same address of the main memory, the stored data of the cache will match with those of the main memory in any case. Consequently, when the other processor or the input/ output device effects a read access to stored data in the main memory, data communication can be achieved between the processors or between the processor and the input/output device. If the other processor or the input/output device achieves a write operation at the same address of the main memory, the stored data in the cache will not match with data of the; main memory; and so, in consequence, the invalidating control circuit invalidates the data stored in the cache.

In the latter case (of the private region access), the cache device conforms to the output of the region discriminating circuit so as to operate accordance with in the copy-back method. That is, in a case where an address for a write access from the processor causes a hit in the cache, the write data from the processor is not written in the main memory, namely, the data is stored only in the cache; and hence, it is possible to complete the write operation in a minimized period of time.

BRIEF DESCRIPTION OF THE DRAWINGS

These and other objects and advantages of the present invention will become apparent by reference to the following description and accompanying drawings wherein.

DESCRIPTION OF THE PREFERRED EMBODIMENTS

Description will now be given of an embodiment according to the present invention.

Figure 2:
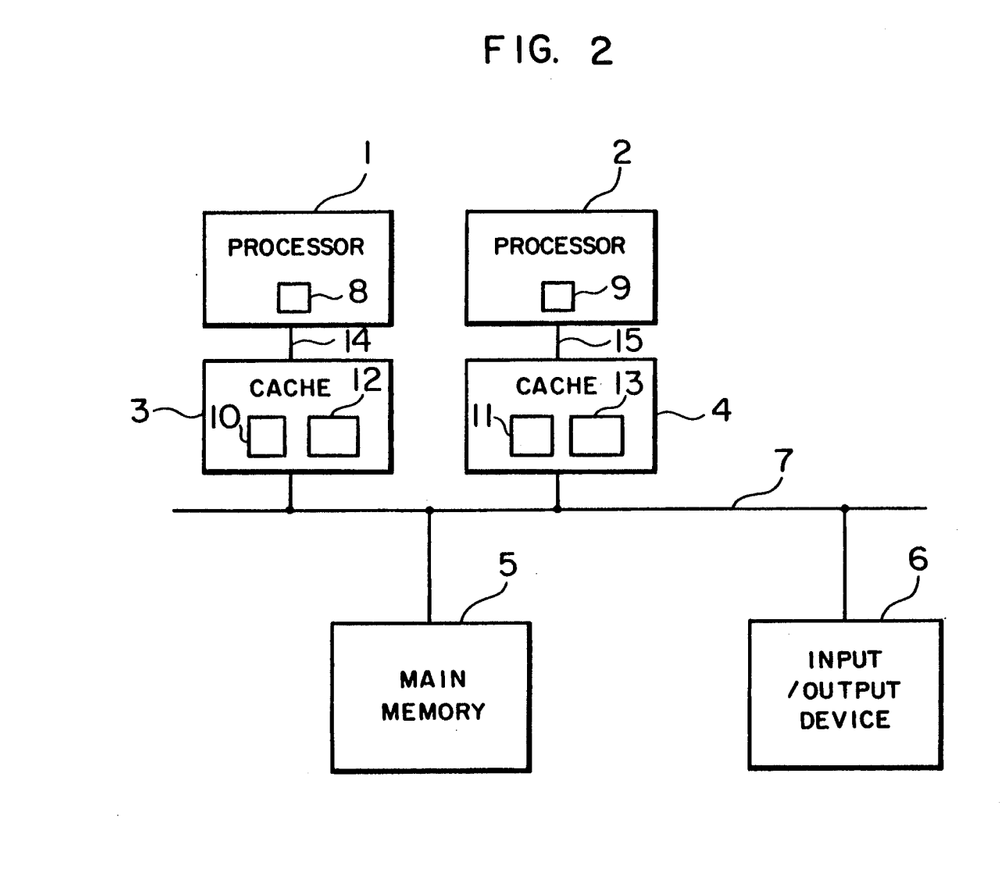
FIG. 2 is a block diagram showing a multi-processing system as an embodiment according to the present invention.

FIG. 2 shows a configuration of a multi-processing system of a shared memory type as an embodiment according to the present invention. Processors 1 and 2 have caches 3 and 4 respectively associated therewith. The caches 3 and 4 are connected to a main memory bus 7 so as to be linked to a main memory 5 in which instructions and data are stored. The main memory bus 7 is also connected to an input/output device 6 so as to communicate data therethrough.

The processors 1 and 2 possess address translation tables 8 and 9, respectively, for effecting address translation from logical addresses into physical addresses when the processors 1 and 2 access data. To interfaces 14 and 15, respectively, between the processors 1 and 2 and the caches 3 and 4, there are transmitted the physical addresses obtained by the address translation.

In the caches 3 and 4, there are arranged address arrays 10 and 11 and data arrays 12 and 13, respectively. The data arrays 12 and 13 are used to temporarily store therein data of the main memory 5, whereas the address arrays 10 and 11 are disposed to keep therein physical addresses of data items stored in the data arrays 12 and 13, respectively.

Figure 1:
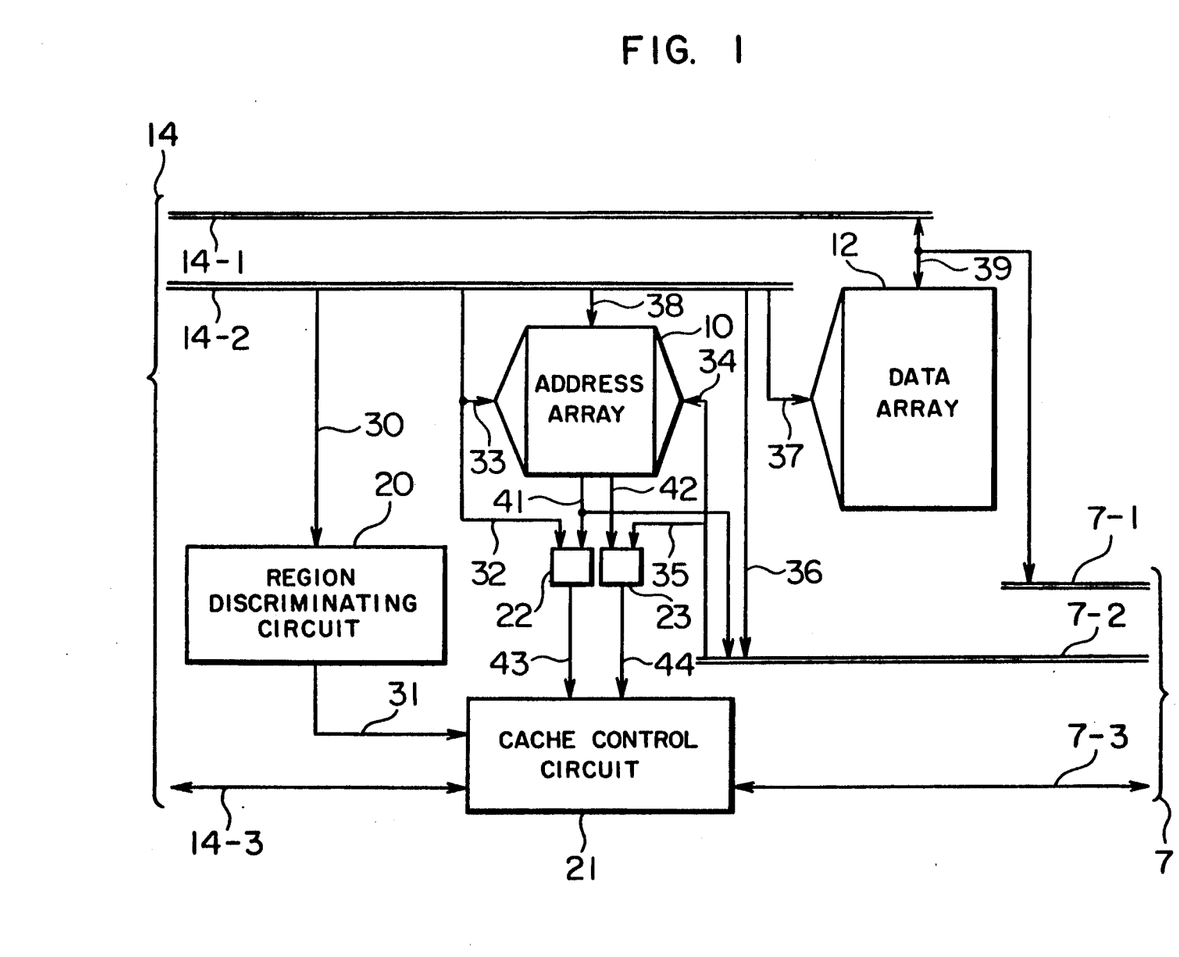
FIG. 1 is a block diagram schematically showing an internal configuration of a cache device as an embodiment according to the present invention.

FIG. 1 shows an internal constitution of the cache 3. Incidentally, the internal configuration of the cache 4 is the same as that of the cache 3. In the embodiment, a word is a data item including four bytes. Reference numeral 14 is a group of interface signal lines which include 4-byte wide data lines 41-1, 24-bit wide address lines 14-2 indicating an address, and control lines 14-3. In addition, the cache 3 is connected to the main memory bus 7, which includes 4-byte wide data lines 7-1, 22-bit wide address lines 7-2 indicating a word address, and control lines 7-3.

Each of the cache 3 and 4 is constituted by use of a direct map scheme of a block length of four bytes. The address array 10 comprises a two-port random access memory (RAM) of a capacity of 8192 columns ×11 bits. The 11 bits includes a 9-bit address tag, a 1-bit update bit, and a 1-bit validity bit. The data array 12 comprises a random access memory (RAM) of a capacity of 8192 columns×32 bits. When valid data is stored in a column of the data array 12, nine high-order bits of an address of the data is stored as an address tag in the same column of the address array 10 and the validity bit is set to 1. The update bit is set to 1 when the value of the validity data of the data array 12 does not match with the value of the associated word in the main memory 5.

Figure 3:
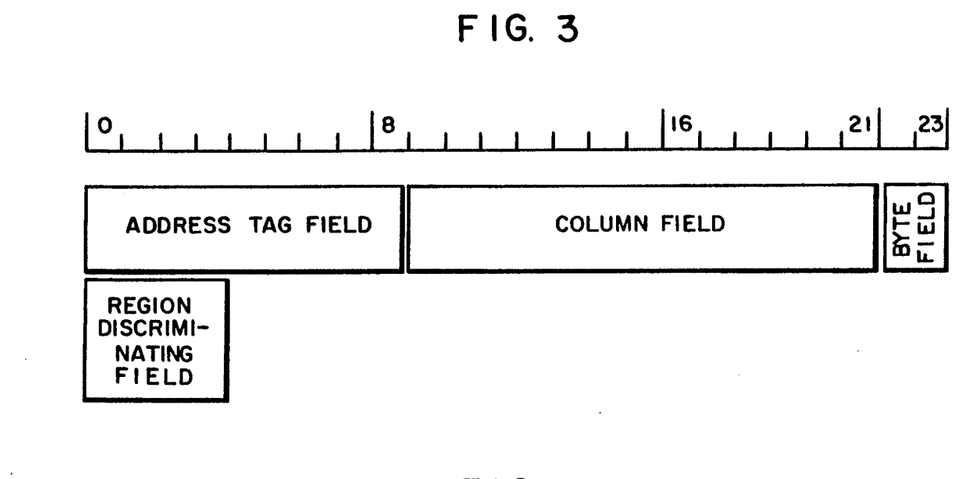
FIG. 3 is a schematic diagram showing an address field employed for a memory access in an embodiment according to the present invention.

FIG. 3 shows a 24-bit address field in which bit 0 is the most significant bit and bit 23 is the least significant bit. Bits 0 to 8 constitute an address tag field including information to be stored in the address array 10. Bits 9 to 21 form a column field to be employed to select a column of the address array 10 or the data array 12, namely, an address of the RAM. In addition, bits 0 to 3 are used as a region discriminating field for discriminating a copy-back region from a write-through region. Bits 22 and 23 form a byte field to indicate a byte location in a word.

As an address 33, 34 of the RAM constituting the address array 10 of FIG. 1, there are adopted a column field on the address lines 14 2 from the processor 1 and a column field on the address lines 7-2 from the main memory bus 7. Reference numerals 32 and 35 are tag fields of the address lines 14-2 and 7-2, respectively, and are inputted to the address tag comparators 22 and 23, respectively. Other inputs, respectively, of the address tag comparators 22 and 23 are supplied, respectively, with address tags 41 and 42 read out from two ports of the address array 10. The comparison results are reported as hit/miss hit signals 43 and 44 to a cache control circuit 21. Reference numeral 38 indicates an address tag field of the address lines 142, whereas reference numeral 36 is a path linking the address lines 14-2 on the processor side to the address lines 7-2 on the main memory side.

For an address 37 of the data array 12, there is used a column field of the address lines 14-2. A write/read path 39 to the data array 12 is connected to the data lines 14-1 on the processor side and the data lines 7-1 on the main memory side.

Reference numeral 20 indicates a region discriminating circuit for discriminating a copy-back region from a write-through region. The region discriminating circuit 20 is supplied with an input 30 including the 4-bit region discriminating field of the address lines 14-2, and the discrimination result is reported through a signal line 31. When the value of the signal line 31 is 1, a copy-back region is indicated; and when the value is 0, a write-through region is indicated.

Figure 4:
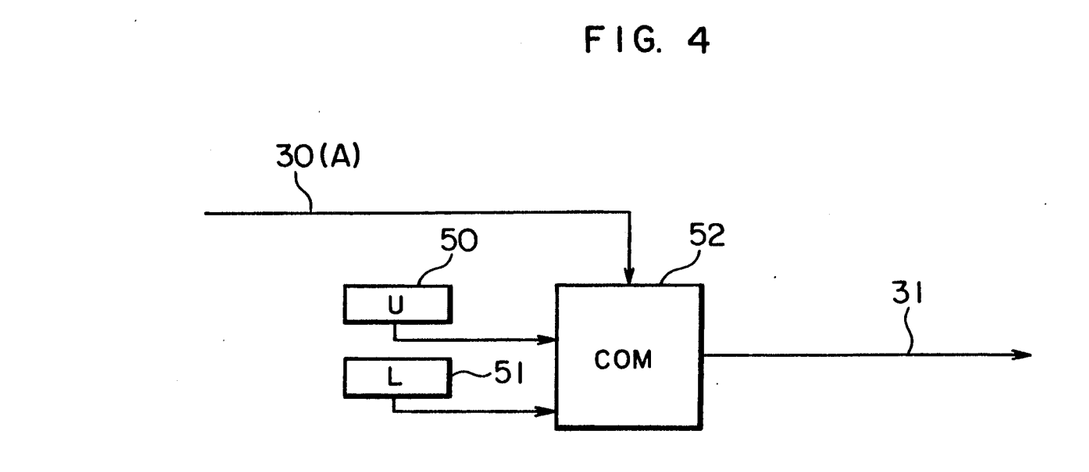
FIG. 4 is a block diagram schematically showing a region discriminating circuit in a cache device as an embodiment according to the present invention.

FIG. 4 shows an internal configuration of the region discriminating circuit 20, which includes 4-bit registers 50 and 51. The registers 50 and 51 are used to set thereto four high-order bits of the upper limit address of the copy-back region and four high-order bits of the lower limit address of the copy-back region, respectively. A value A of the four high order bits 30 on the address lines 14-2 from the processor 1 is compared with values U and L, respectively, of the registers 50 and 51 by means of a comparator 52, such that for a condition of $L \leq A \leq U$, the value of the region discriminating signal 31 is set to 1 (indicating a copy-back region) and that for a condition of $A<L$ or $U<A$, the signal 31 is set to 0 (indicating a write-through region).

Figure 5:
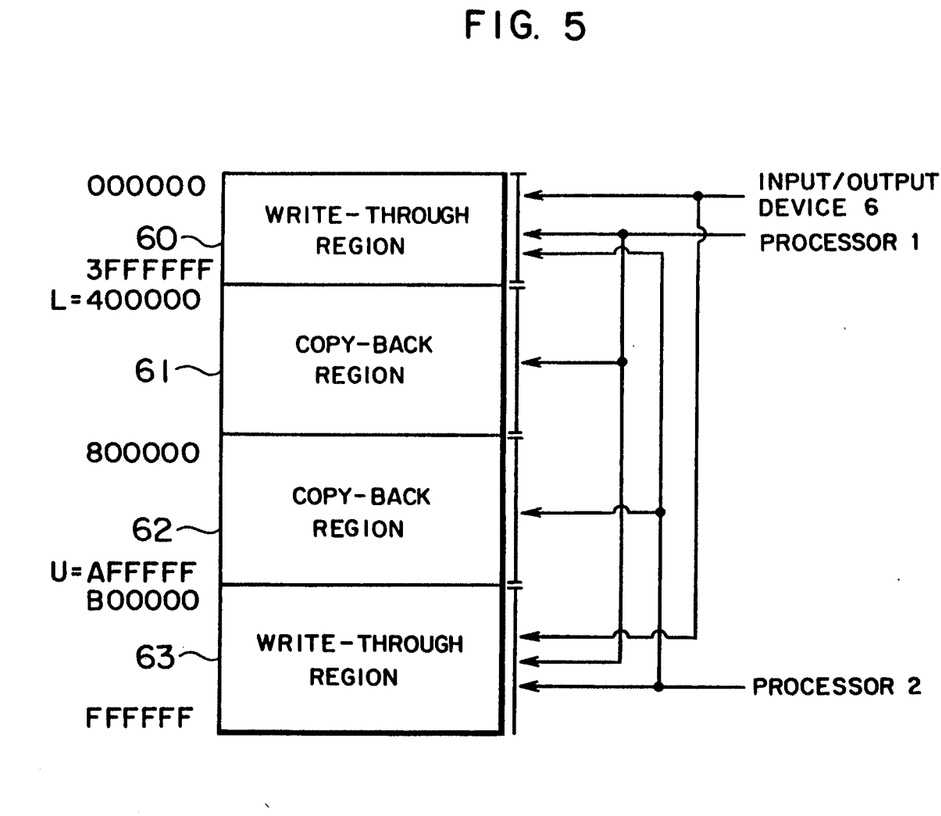
FIG. 5 is a schematic diagram showing a region subdivision of the main memory in the system of FIG. 2.

FIG. 5 shows a region dividing or a region subdivision of the main memory 5. The space of the main memory 5 is addressable in a range from address 000000 to address FFFFFF. In this space, a region ranging from address 000000 to address 3FFFFF and a region ranging from address B00000 to address FFFFFF are write-through regions 60 and 63, respectively. A region ranging from address 400000 to address 7FFFFF is a copy-back region 61 dedicated to the processor 1, whereas a region ranging from address 800000 to address AFFFFF is a copy-back region 62 dedicated to the processor 2. The write-through regions 60 and 63 undergo a write access from the processors 1 and 2 and the input/output device 6. On the other hand, the copy-back region 61 is subjected to a write access only from the processor 1, and the copy-back region 62 undergoes a write access only from the processor 2. The access control operations are effected by use of the address translation tables 8 and 9 in the processors 1 and 2, respectively. For example, when the processor 1 accesses data, a logical address for the access is translated into a physical address of the main memory 5. In this regard, the contents of the address translation tables are set such that the address obtained by the translation enters an address range of the write-through region or the dedicated copy-back region.

In order to discriminate the regions, a hexadecimal value U is set to the register 50 of FIG. 4 and a hexadecimal value L is set to the register 51. As a result, when the processor 1 accesses the write-through region 60 or 63, the value of the signal line 31 is set to 0 and the cache control circuit 21 controls the cache 3 according to the write-through method. On the other hand, when the processor 1 accesses the copy-back region 61, the value of the signal line 31 is set to 1 and hence the cache control circuit 21 controls the cache 3 in accordance with the copy-back method.

Figure 6:
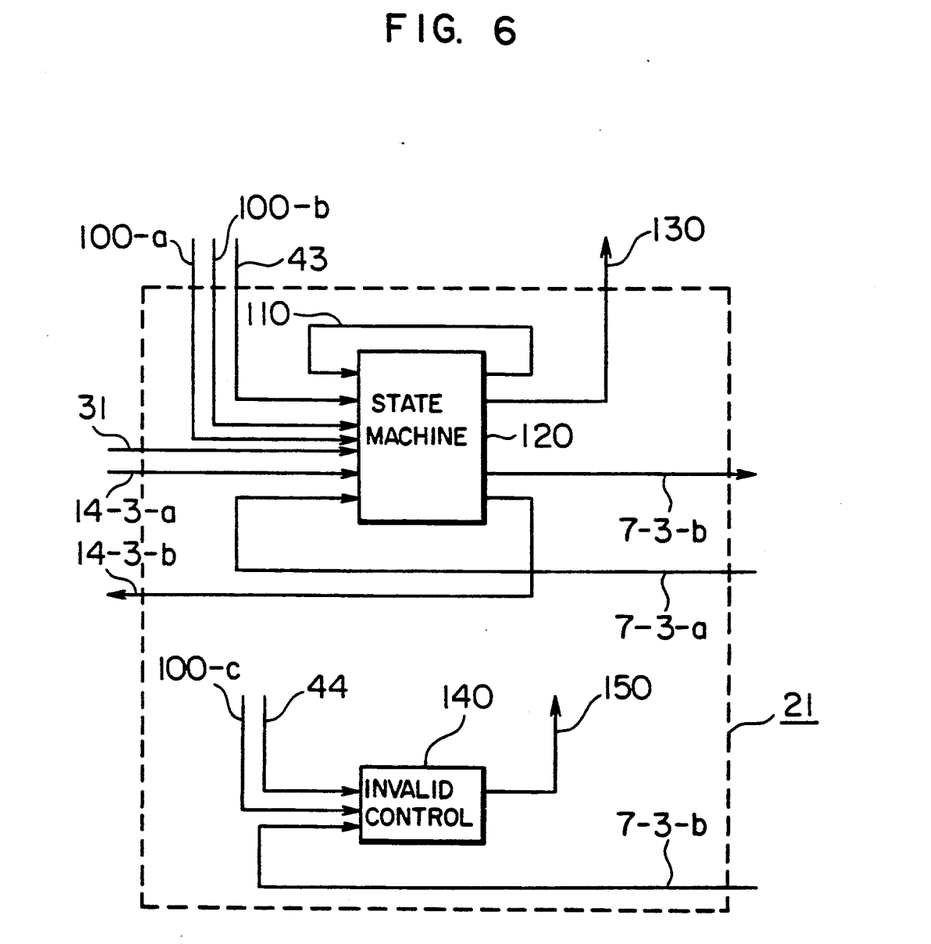
FIG. 6 is a block diagram schematically showing a cache control circuit in the cache device as an embodiment according to the present invention.

FIG. 6 shows an internal constitution of the cache control circuit 21 controlling the operation described above. Reference numeral 120 is a state machine to control the read/write operation on the write-through region and the copy-back region, whereas reference numeral 140 indicates a circuit to control the invalidating operation of the address array 10 by monitoring the main memory bus 7.

The state machine 120 receives inputs including a group of state signals 110 representing a present state, a hit/miss hit signal 43 indicating a result of the comparison between the address tag on the processor side and the tag in the address array 10, a validity bit signal 100-a read out from the address array 10, an update bit signal 100-b therefrom, a report signal 31 reporting the region discrimination, a group of interface control input signals 14-3-a for establishing interfaces between the processor and the cache, and a memory bus control signal 7-3-a. The interface control input signal 14-3-a includes an access start signal indicating that the processor has started an access and a read/write identifying signal. The memory bus control signal 7-3-a is a signal indicating the end of the memory bus cycle.

The state machine 120 outputs a group of internal control signals 130 to control the read/write operations on the address array 10 and the data array 12 in the cache, a group of memory bus control signals 7-3-b, and an interface control output signal 14-3-b. The group of memory bus control signals 7-3-b includes a memory bus cycle start signal and a read/write request or indicate signal. In addition, the interface control output signal 14-3-b is an access end signal for the processor.

The state machine 120 is responsive to the respective input signals to produce output signals for implementing the control operations described above. Particularly, since the report signal 31 as a result of the region discrimination is supplied to the state machine 120, the control operations of the write-through method and the copy-back method are implemented depending on the discrimination result only by means of the state machine 120.

The circuit 140 to control the invalidating operation of the address array 10 receives inputs including a hit/miss signal 44 reporting the result of the comparison effected between the address tag on the main memory bus 7 and the tag in the address array 10, a validity bit signal 100-c read out from the address array 10 by use of the address on the main memory bus 7, and the group of memory bus control signals 7-3-b. The group of memory bus control signals 7-3-b includes a memory bus start signal and a read/ write request signal.

The circuit 140 based on the group of memory bus control signals 7-3-b, recognizes, a condition that a write operation is to be effected on the main memory from another master on the main memory bus 7, and the circuit 140 generates, an invalidating control signal 150 to invalidate the address array 10 according to the signal 44 and the state of the validity bit signal 100-c at the time.

Next, referring to the flowcharts of FIGS. 7 to 9, description will be given of the control operation conducted by the cache control circuit 21 for the cache memory 3.

I. Read operation effected by processor 1 onto cache 3 and main memory 5

Figure 7:
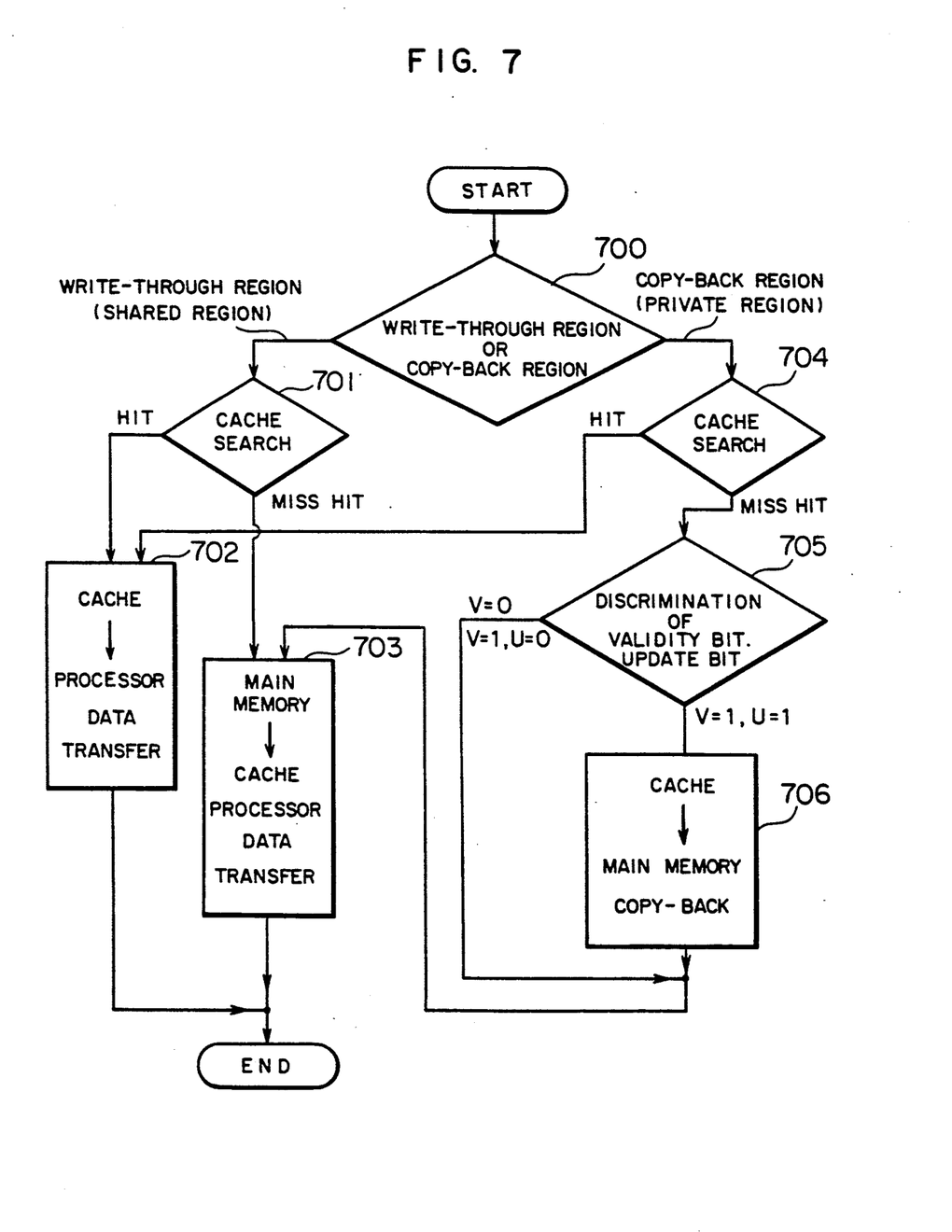
FIG. 7 is a flowchart useful to explain a read operation of the multi-processing system as an embodiment according to the present invention.

It is determined whether the address signal issued from the process 1 is to be used for an access to a write-through region or a copy-back region (FIG. 7 step 700).

(1) Read operation from write-through region

In the step 700 of FIG. 7, if the value A of the four high-order bits of the address signal produced from the processor 1 satisfies the conditions $A<L$ or $U<A$, the value of the region discriminating signal 31 of the comparator circuit 52 of FIG. 4 is set to 0, and it is determined that the access is effected to the write-through region (60 or 63). While the region discriminating signal 31 is being outputted from the comparator circuit 52, the processing proceeds to a step 701 of FIG. 7 to effect a cache search operation.

In the cache search operation in the step 701, the address array 10 of the cache 3 undergoes a search operation such that if a hit occurs as a result (namely, the value 32 of the address tag field of the access address matches with the value 41 read out from the address array 10 and hence the hit signal 43 is asserted and the validity bit read out together with the address tag is 1), the state machine 120 of the cache control circuit 21 in the cache 3 passes control to step 702 of FIG. 7 in response to the write-through region discriminating signal 31 and the hit signal 43.

In the step 702, according to the column field of the address signal produced from the processor 1, data is read from the data array 12 onto the data lines 14-1 at a high speed so as to be transferred to the processor 1.

On the other hand, if a hit does not occur as a result of the cache search operation in the step 701, the state machine 120 of the cache control circuit 21 in the cache 3 passes control to step 703 of FIG. 7 in response to the write-through region discriminating signal 31 and the hit signal 43.

In the step 703, the state machine 120 starts the memory bus cycle such that an address from the processor 1 is supplied via the signal line 36 to the address lines 7-2 of the main memory bus 7. According to the address, data is read from the main memory 5 so as to be written via the data lines 7-1 into the data array 12. At the same time, the data is transferred via the data lines 14-1 to the processor 1. On the other hand, in the address array 10, an address tag is written in the corresponding column such that 1 and 0 are stored in the validity bit and the update bit, respectively.

(2) Read operation from copy-back region

In the step 700 of FIG. 7, if the value A of the four high-order bits of the address signal produced from the processor 1 satisfies the condition $L \leq A \leq U$, the value of the region discriminating signal 31 of the comparator circuit 52 of FIG. 4 is set to 1, and it is determined that the access is effected to the copy-back region (61 or 62). While the region discriminating signal 31 is being outputted from the comparator circuit 52, the processing proceeds to a step 704 of FIG. 7 to effect a cache search operation.

In the cache search operation in the step 704, the address array 10 of the cache 3 undergoes a search operation such that if a hit occurs as a result, the state machine 120 of the cache control circuit 21 in the cache 3 passes control to the step 702 of FIG. 7 in response to the copy-back region discriminating signal 31 and the hit signal 43.

On the other hand, if the hit does not occur as a result of the cache search operation in the step 704, the state machine 120 of the cache control circuit 21 in the cache 3 passes control to step 705 of FIG. 7 in response to the copy-back region discriminating signal 31 and the hit signal 43.

In the step 705, a judge operation is effected on the validity bit and the update bit read from the address array 10.

When a miss results from the read operation, if the validity bit and the update bit read from the address array 10 are respectively 1, it is indicated that the stored data in the cache 3 corresponding to the column field of the address signal from the processor 1 does not correspond to the stored data in the main memory 5. In consequence, at this miss occasion, prior to reading data from the main memory 5 and transferring the data to the processor 1 so as to simultaneously store the data in the cache 3, it is necessary to return (to copy back) the stored data in the cache 3 corresponding to the column field of the address signal from the processor 1 into the main memory 5. If the copy-back operation is omitted, there arises a problem after the processing of the step 703 thereafter that the data corresponding to the column field of the address signal from the processor 1 and the tag field already stored in the address array 10 of the cache 3 is missing in the data array 12 of the cache 3 and in the main memory 5.

In order to avoid this problem, the state machine 120 of the cache control circuit 21 in the cache 3 passes control to step 706 of FIG. 7 in response to the validity bit 100-$a$ (1), the update bit 100-$b$ (1), and the region discriminating signal 31 (1).

In the step 706, the state machine 120 starts the memory bus cycle such that the stored data of the cache 3 corresponding to the column field of the address signal from the processor 1 is written in the main memory 5. In this case, the address of the main memory 5 is indicated by an address signal including the column field of the address signal from the processor and the address tag field read from the address array 10 onto the signal line 41 so as to be concatenated therewith. Based on the concatenated address signal, the stored data of the cache 3 corresponding to the column field of the address signal from the processor 1 is written (copied back) in the main memory 5. After the step 706 is executed to process the copy-back operation, control is passed to the step 703 (in which for a miss condition, a read operation is achieved on the main memory 5, the data and the tag address are stored in the cache 3, and the data is transferred to the processor 1).

On the other hand, as a result of the judgement of the validity and update bits carried out in the step 705, if the validity bit is 0, or if the validity bit is 1 and the update bit is 0, it is indicated that the stored data in the cache 3 is invalid or the valid stored data in the cache 3 conforms or corresponds to the stored data in the main memory 5; in consequence, without effecting the copy-back processing in the step 706, the processing directly proceeds to the step 703 (in which for a miss condition, a read operation is achieved on the main memory 5, the data and the tag address are stored in the cache 3, and the data is transferred to the processor 1).

II. Write operation effected by processor 1 on cache 3 and main memory 5

Figure 8:
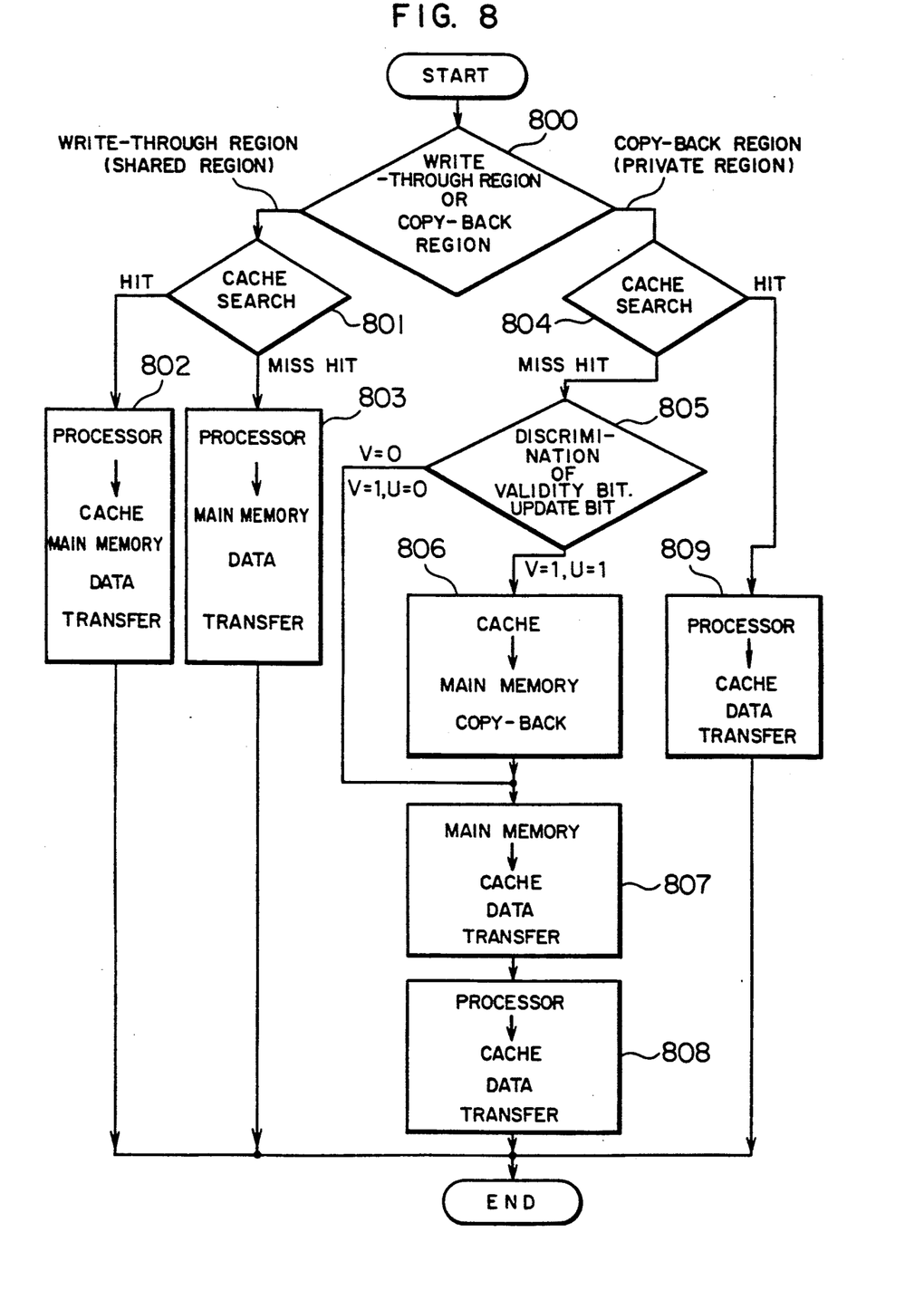
FIG. 8 is a block diagram schematically showing a write operation in the multi-processing system as an embodiment according to the present invention.

It is determined whether the address signal produced from the processor 1 is to be used to access a write-through region or a copy-back region (FIG. 8, step 800).

(3) Write operation on write-through region

In the step 800 of FIG. 8, if the value A of the four high-order bits of the address signal produced from the processor 1 satisfies the condition $A<L$ or $U<A$, the value of the region discriminating signal 31 of the comparator circuit 52 of FIG. 4 is set to 0, and it is determined that the access is effected to the write-through region (60 or 63). While the region discriminating signal 31 is being outputted from the comparator circuit 52, the processing proceeds to a step 801 of FIG. 8 to effect a cache search operation.

In the cache search operation in the step 801, the address array 10 of the cache 3 undergoes a search operation such that if a hit occurs as a result (namely, the value 32 of the address tag field of the access address matches with the value 41 read out from the address array 10 and hence the hit signal 43 is asserted and the validity bit read out together with the address tag is 1), the state machine 120 of the cache control circuit 21 in the cache 3 passes control to step 802 of FIG. 8 in response to the write-through region discriminating signal 31 and the hit signal 43.

In the step 802, according to address signal produced from the processor 1, write data is written in the data array 12. On the other hand, the state machine 120 starts the memory bus cycle so as to store the write data also in the main memory 5.

On the other hand, if a hit does not occur as a result of the cache search operation in the step 801, the state machine 120 of the cache control circuit 21 in the cache 3 passes control to step 803 of FIG. 8 in response to the write-through region discriminating signal 31 and the miss signal 43.

In the step 803, the write data is not stored in the data array 12 of the cache 3. On the other hand, the state machine 120 starts the memory bus cycle such that the write data is stored in the main memory according to the address from the processor 1.

(4) Write operation onto copy-back region

In the step 800 of FIG. 8, if the value A of the four high-order bits of the address signal produced from the processor 1 satisfies the condition $L \leq A \leq U$, the value of the region discriminating signal 31 of the comparator circuit 52 of FIG. 4 is set to 1, and it is determined that the access is effected to the copy-back region (61 or 62). While the region discriminating signal 31 is being outputted from the comparator circuit 52, the processing proceeds to a step 804 of FIG. 8 to effect a cache search operation.

In the cache search operation in the step 804, the address array 10 of the cache 3 undergoes a search operation such that if a hit occurs as a result, the state machine 120 of the cache control circuit 21 in the cache 3 passes control to the step 809 of FIG. 8, which will be described later, in response to the copy-back region discriminating signal 31 and the bit signal 43.

On the other hand if a hit does not occur as a result of the cache search operation in the step 804, the state machine 120 of the cache control circuit 21 in the cache 3 passes control to step 805 of FIG. 8 in response to the copy-back region discriminating signal 31 and the miss signal 43.

In the step 805, a judgement operation is effected on the validity bit and the update bit read from the address array 12.

When a miss results from the write operation, if the validity bit and the update bit read from the address array 12 are respectively 1, it is indicated that the stored data in the cache 3 corresponding to the column field of the address signal from the processor 1 does not correspond to the stored data in the main memory 5. In consequence, at this miss occasion, prior to storing data from the processor 1 into the cache 3, it is necessary to return (to copy back) the stored data in the cache 3 corresponding to the column field of the address signal from the processor 1 into the main memory 5. If the copy-back operation is omitted, there arises a problem after the processing of the step 807 thereafter that the data corresponding to the column field of the address signal from the processor 1 and the tag field already stored in the address array 10 of the cache 3 is missing in the data array 12 of the cache 3 and in the main memory 5.

In order to avoid this problem, the state machine 120 of the cache control circuit 21 in the cache 3 passes control to step 806 of FIG. 8 in response to the validity bit 100-$a$ (1), the update bit 100-$b$ (1), and the region discriminating signal 31 (1).

In the step 806, the state machine 120 starts the memory bus cycle such that the stored data of the cache 3 corresponding to the address signal from the processor 1 is written in the main memory 5. In this case, the address of the main memory 5 is indicated by an address signal including the column field of the address signal from the processor 1 and the address tag field read from the address array 10 onto the signal line 41 so as to be concatenated therewith. Based on the concatenated address signal, the stored data of the cache 3 corresponding to the column field of the address signal from the processor 1 is written (copied back) in the main memory 5.

After the step 806 is executed to process the copy back operation, the state machine 120 passes control to the step 807 so as to initiate another memory bus cycle. In the step 807 the main memory 5 is accessed according to the address tag field and the column field of the address signal which is generated from the processor 1 and which is transmitted onto the address lines 14-2, 36, and 7-2, so that the data read from the main memory is stored in the data array 12 of the cache 3.

After the step 807 executing the data transfer from the main memory 5 to the cache 3, the state machine 120 passes control to step 808 of FIG. 8. In the step 808, according to the address tag field and the column field of the address signal which is generated from the processor 1 and which is transmitted onto the address lines 14-2, 36, and 7-2, the write data from the processor 1 is written in the data array 12 of the cache 3 so as to overwrite on the existing data. On the other hand, the corresponding column of the address array 10 of the cache 3 is loaded with the address tag such that 1 is written as the validity bit and the update bit.

On the other hand, as a result of the judgement operation on the validity and update bits in the step 805, if the validity bit is 0, or if the validity bit is 1 and the update bit is 0, it is indicated that the stored data in the cache 3 is invalid or the valid stored data in the cache 3 conforms or corresponds to the stored data in the main memory 5; in consequence, without effecting the copy-back processing of the step 806, the processing directly proceeds to the steps 807 and 808 (in which for a miss condition, the data is transferred from the main memory 5 to the cache 3 and the processor 1 writes data in the cache 3 so as to overwrite on existing data).

On the other hand, in the cache search operation of step 804, if the search in the address array 10 of the cache 3 results in a hit, control is transferred the step 809. In the step 809, the write data from the processor 1 is written in the data array 12 of the cache 3. In this operation, since the write data from the processor 1 is not written in the main memory 5, the write operation can be completed in a minimized period of time. Incidentally, due to the write operation, the stored data in the cache 3 does not correspond to the stored data in the main memory 5; consequently, 1 is written in the update bit of the corresponding column in the address array 10 of the cache 3.

III. Processing of memory write operation by other processor 2 or input/output device 6

There may exist a case where after the processor 1 writes the same data in the cache 3 and the write-through region 60 of the main memory 5, the other processor 2 or the input/output device 6 stores other data in the main memory at the same address where the processor 1 wrote the data. In this situation, since the correspondence between the stored data of the cache 3 and that of the main memory 5 cannot be guaranteed, it is necessary to invalidate the data stored in the cache 3.

For the invalidation of the data, the address array 10 of the cache 3 monitors a write address issued from the processor 2 or the input/output device 6 for the main memory 5. The write address is inputted from the address lines 7-2 on the main memory side such that the column field thereof is fed to a port address 34 of the address array 10. In order to determine whether or not a write operation is being executed on the main memory, the control circuit 140 of the cache control circuit 21 in the cache 3 monitors the control line 7-3-b. The address tag 42 read from the address array 10 is compared with the value of the address tag field 35 on the address lines 7-2 by means of the comparator 23. In a case where these values are identical to each other, where the hit signal 44 is asserted, and where the validity bit 100-c read out at the same time is one, 0 is written in the validity bit via a control signal line 150 so as to invalidate the column. These operations are effected under control of the cache control circuit 21.

Figure 9:
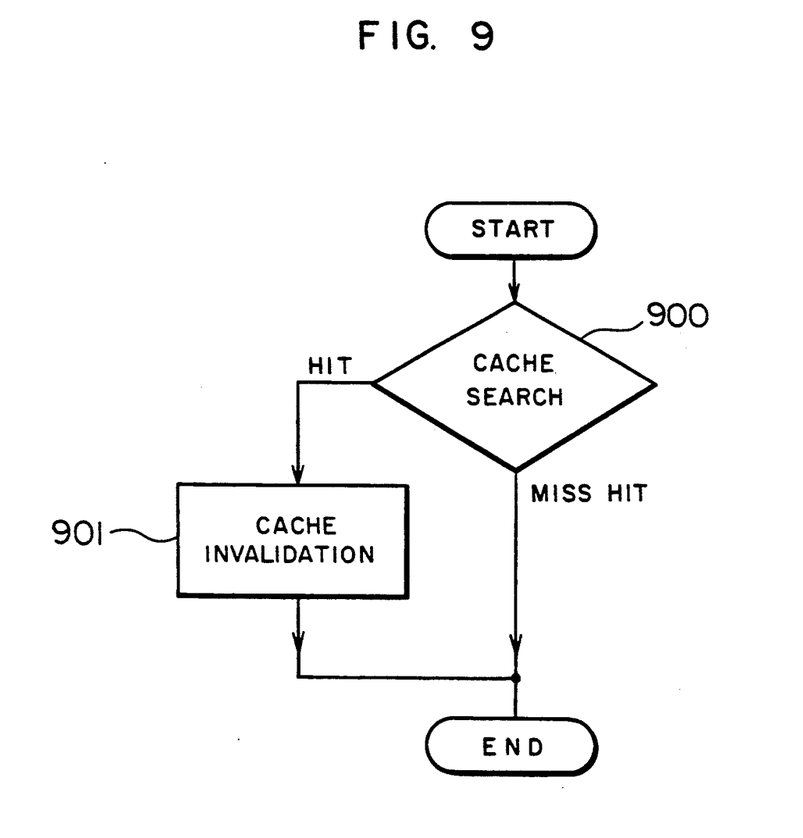
FIG. 9 is a flowchart useful to explain an invalidating operation of the multi-processing system as an embodiment according to the present invention.

FIG. 9 is a flowchart showing a processing flow of the invalidation.

When a write address is supplied from the address lines 702 on the main memory side, control is passed to a step 900. In the step 900, a cache search operation is conducted on the address array 10 by use of the write address.

As a result of the search, if the comparator 23 delivers the hit signal 44 from an output thereof and the validity bit 100-c readout from the address array 10 is one, the processing proceeds to a step 901 to effect the invalidation processing. In the step 901, the validity bit of the pertinent column of the address array 10 is loaded with 0.

On the other hand, if the cache search operation of the step 900 results in a miss hit, the processing is terminated without effecting the step 901 of the invalidation.

Through the operation described above, the data consistency is retained among the caches 3 and 4 and the main memory 5 with respect to the write-through regions.

The present invention is not restricted by the embodiments described above, namely, it is possible to adopt various variations thereof.

For example, in FIG. 2, the number respectively of the processor 1 and 2 and the cache 3 and 4 is not limited to two. It is natural that three or more units of the processors and caches may be respectively connected so as to increase the data processing capability.

Incidentally, in the configuration of FIG. 2, a combination of the processor 1 and the cache 3 may be manufactured in one microcomputer chip and a combination of the processor 2 and the cache 4 may be manufactured in another microcomputer chip.

In addition, although the copy-back region 61 of FIG. 5 undergoes a write access only from the processor 1, the copy-back region 61 may be subjected to a read access from the processor 2 o the input/output device 6. Similarly, although the copy-back region 62 of FIG. 5 undergoes a write access only from the processor 2, the copy-back region 61 may be subjected to a read access from the processor 1 or the input/output device 6. This is because through the read access, there does not occur any inconsistency among the stored data in the main memory 5 and the caches 3 and 4.

As described above, in the multi-processing system according to the present invention, it is possible that the write-through method is advantageously adopted in the operation to access the shared region and that the copy-back method is advantageously used in the operation to access the private region.

We claim:

1. A multi-processing system comprising:
   (1) a first processor and a second processor each for generating an address;
   (2) a bus;
   (3) a main memory coupled to said bus;
   (4) an input/output device coupled to said bus;
   (5) a first cache device coupled between said first processor and said bus; and
   (6) a second cache device coupled between said second processor and said bus wherein:
   said main memory is subdivided into a shared region to undergo a write access from said first processor, said second processor, and said input/output device and private regions to undergo a write access from said first processor or said second processor; and
   each of said first and second cache devices includes:
   (a) a region discriminating circuit for determining whether an address generated from said first or second processor is to be employed for an access to the shared region or to the private region; and
   (b) a cache control circuit for controlling a data store operation on said cache devices and on said main memory in response to an output from said region discriminating circuit,
   the output from said region discriminating circuit causing, when the address generated from said first or second processor is used to access the shared region, said cache devices to effect a data write operation in a write-through method,
   the output from said region discriminating circuit causing, when the address generated from said first or second processor is used to access the private region, said cache devices to effect a data write operation in a copy-back method.

2. A multi-processing system according to claim 1 wherein said cache control circuit associated with said first cache device includes means responsive to said second processor or said input/output device rewriting data in the shared region of said main memory for invalidating stored data of the shared region in said first cache device.

3. A cache apparatus to be employed in a multi-processing system comprising first and second processors each for generating an address, a bus, a main memory coupled to said bus, and an input/output device coupled to said bus, said main memory being subdivided into a shared region to undergo a write access from said first processor, said second processor, and said input/output device and private regions to undergo a write access from said first processor or said second processor wherein:
   said cache apparatus includes a first cache device coupled between said first processor and said bus and a second cache device coupled between said second processor and said bus;
   each of said first and second cache devices including:

(a) a region discriminating circuit for determining whether an address generated from said first or second processor is to be employed for an access to the shared region or to the private region; and (b) a cache control circuit for controlling a data store operation on said cache devices and on said main memory in response to an output from said region discriminating circuit, the output from said region discriminating circuit causing, when the address generated from said first or second processor is used to access the shared region, said cache devices to effect a data write operation in a write-through method, the output from said region discriminating circuit causing, when the address generated from said first or second processor is used to access the private region, said cache devices to effect a data write operation in a copy-back method.

4. A multi-processing system according to claim 3 wherein said cache control circuit associated with said first cache device includes means responsive to said second processor or said input/output device rewriting data in the shared region of said main memory for invalidating stored data of the shared region in said first cache device.

* * * * *